Patented Apr. 22, 1947

2,419,202

UNITED STATES PATENT OFFICE 2,419,202

INTERPOLYMERIZING BUTADIENE, STYRENE, AND ETHYL ACRYLATE

Gaetano F. D'Alelio, Pittsfield, Mass., assignor to General Electric Company, a corporation of New York No Drawing. Application September 17, 1942, Serial No. 458,728

3 Claims. (Cl. 260—84.5)

The present invention relates to new synthetic resinous compositions and more particularly to potentially reactive (i. e., heat-convertible or vulcanizable) compositions which possess the properties of thermoplastic resins modified by the characteristics of the heat-convertible types of resins. This invention, more specifically, deals with compositions of matter comprising the polymerization products of a mixture of the following polymerizable components: (1) at least one vinyl aryl compound, e. g., styrene, (2) at least one acrylic acid ester of the formula

where Z is a radical of a monohydric alcohol, e. g., methyl, ethyl, phenyl, etc., and (3) at least one diene-1,3, of the formula

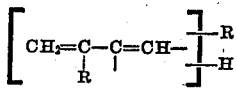

where R is a member of the class consisting of hydrogen and the methyl radical, the limits of the polymerizable components used being within the range hereinafter specified.

Vinyl aryl compounds heretofore have been polymerized alone and together with other polymerizable bodies to yield moldable compositions having a wide variety of uses in the molding and coating plastic arts. Although such polymeric compositions have found applications, they have been precluded from use wherever heat-resistant or shock-resistant materials are required. When polymers or copolymers of vinyl aryl compounds are heated to elevated temperatures in the range of 80–120° C., they lose their shape and begin to shrink in size. This, of course, is characteristic of all thermoplastic bodies, and is the chief disadvantage in using them.

I have now discovered that the heat resistance and shock resistance of vinyl aryl polymers and copolymers may be improved without materially affecting their electrical properties. Such improvement in the character and properties of the polymerized bodies of vinyl aryl compounds, I have found, may be obtained by copolymerizing therewith at least one acrylic acid ester and at least one diene-1,3 within specific ranges or limits. Polymeric bodies are thus produced which are tough and resistant to shock and which are heat convertible to heat-resistant products.

Primarily, the amount of diene-1,3 and acrylic acid ester which must be used in conferring the desirable properties upon the copolymer is relatively small. This is important because large quantities of a diene-1,3 such as used in butadiene-1,3-styrene synthetic rubber copolymers have a tendency to slow down the rate of polymerization, thus reducing the economic feasibility of the process. Using small quantities of a diene-1,3 does not substantially retard the polymerization rate of the reaction. On the other hand the addition of small amounts of an ester of acrylic acid seems to increase the rate of reaction, thus the importance of the use of the acrylic ester becomes twofold.

Within the range of compositions used in the practice of my invention, low pressure equipment is satisfactory for the process and the yield of the copolymer is substantially quantitative within a reasonable reaction time. Since a conversion of 100% of the polymerizable mass occurs in the practice of this invention, no complicated or expensive recovery system is required for the unconverted diene-1,3 as now found in the conventional synthetic plants. Too, since the diene-1,3 used in preparing the compositions of this invention is in the minor proportion, in the unvulcanized or unconverted state, these compositions find utility as thermoplastic resins. The convertible and vulcanizable compositions of this invention have greater utility than the ordinary thermoplastic compositions. The presence of the ester groups permits the compatibility of these compositions with numerous resinous and synthetic bodies, not normally compatible with other resinous compositions. The presence of both the ester groups and the two hydrocarbon groups, e. g., the diene-1,3 and the vinyl aryl compound, permits a wide range of plasticizers as well as extenders to be incorporated into the polymerized mass.

The polymerizable components used in the practice of this invention may be varied within the following limits depending on the nature of the product desired.

| Polymerizable Component | Percentages by Weight |
|---|---|
| Mono-vinyl aryl compound | 66–85 |
| Acrylic acid ester | 5–25 |
| Diene-1,3 | 5–20 |

Although I may use any composition which falls within the limits above specified, I prefer those compositions prepared from the ingredients within the following range:

| Polymerizable Component | Percentages by Weight |
| --- | --- |
| Mono-vinyl aryl compound | 70-80 |
| Acrylic acid ester | 10-25 |
| Diene-1,3 | 5-10 |

It is evident in compositions of the type described in this invention, wherein good electrical properties are desired, that reducing the amount of the mono-vinyl aryl compound present in the copolymer seriously reduces the electrical resistance of the composition. At the same time, when the styrene component is increased beyond the specified limits, the final polymer becomes brittle and likewise less desirable for industrial use. The acrylic acid ester and the diene-1,3 components, when present to the extent indicated, increase the toughness and lend vulcanizability with resultant reduction in cold flow, respectively, to the composition.

The term mono-vinyl aryl compound embraces within its meaning styrene and homologues of styrene, such as alpha-methyl styrene, ortho-methyl styrene, meta-methyl styrene, para-methyl styrene, the ortho-, meta-, and para-ethyl styrene, the ortho-, meta-, and para-ethyl styrenes, the ortho-, meta-, and para-vinyl benzoic esters, the ortho-, meta- and para-vinyl phenyl ethers, the vinyl diphenyls, the vinyl naphthalenes, etc.

The term diene-1,3 includes the hydrocarbon materials of the formula

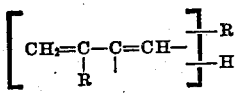

wherein R is a member of the class consisting of hydrogen and the methyl radical. It is apparent from an inspection of the above formula that the term diene-1,3 includes both the butadienes-1,3 of the formula

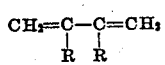

where R has the meaning above given, and the pentadienes-1,3 of the formula

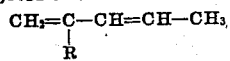

where R has the meaning given above.

As pointed out above the acrylic ester component is represented by the structure

where Z is the radical of a monohydric alcohol, for example, methyl, ethyl, propyl, butyl, amyl, hexyl, phenyl, chlorophenyl, cresyl, cyclohexyl, naphthyl, phenethyl, phenoxyethyl, phenoxypropyl, nitromethyl, nitrophenyl, nitroethyl, chloroethyl, etc., preferably a lower alkyl radical such as methyl, ethyl, propyl and butyl, for reasons of economy.

I have discovered that the inclusion of the diene-1,3 component within the range above given and with subsequent vulcanization will change the character of the copolymer even when the concentration of the diene is at a minimum. This type of composition has highly improved cold flow properties as compared with compositions which have not been vulcanized. Such compositions as those described in the present invention will withstand deformation forces at slightly elevated temperatures, e. g., 80–110° C., whereas similar unvulcanized samples will not retain their shape at such elevated temperatures even without stress. This resistance to cold flow and low temperature flow is important in many industrial applications.

The polymerizable compositions of this invention may be polymerized in mass or in emulsion form to give a latex type body or in dispersion form to give granulated products, depending upon the product desired and the application for which it is intended. The emulsions or dispersions are preferably prepared in a water medium under the influence of appropriate dispersion or emulsifying agents, e. g., the water soluble soaps, polyvinyl alcohol, polyacrylic acid, polymethacrylic acid, the water soluble salts of polymerized methylene polycarboxylic acids, the water soluble salts of the styrene-maleic anhydride copolymers disclosed and claimed in my copending application, Serial No. 449,677, filed July 3, 1942, and assigned to the same assignee as the present invention, the water soluble salts of the sulfosuccinic esters, etc.

Any suitable method may be used in preparing the polymerized compositions of this invention. For example, the polymerizable component may be polymerized in the presence or absence of a solvent or a dispersion medium for the monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the percompounds, e. g., ammonium persulfate, sodium persulfate, sodium perchlorate, sodium perborate, potassium persulfate, etc.; ozone; ozonides; etc. Additional examples of polymerization catalysts that may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials.

In order that those skilled in the art better may understand how this invention may be carried into effect, the following examples are given:

In the examples where the term vulcanizer is used it means a composition consisting of the following components:

| | Parts by weight |
| --- | --- |
| Altax (benzothiazole disulfide) | 100 |
| Agerite (phenyl beta-naphthylamine) | 100 |
| Zinc oxide | 500 |
| Stearic acid | 100 |
| Sulfur | 200 |

*Example 1*

| | Parts by weight |
| --- | --- |
| Styrene | 560 |
| Ethyl acrylate | 170 |
| Butadiene | 70 |
| 0.23% aqueous solution of sodium salt of styrene-maleic anhydride copolymer | 2,000 |
| Benzoyl peroxide | 4.0 |

The above ingredients were placed in an autoclave fitted with a stirrer and temperature control. The vessel was sealed and the reaction mixture heated at 61° C. for 16 hours and then at 87° C. for 7 hours. The polymerized contents were removed in the form of bead-like granules. A small amount of latex had formed containing 0.9% by weight of solids. The latex was coagulated with hydrochloric acid and heat. The entire polymerized contents were washed thoroughly and dried. A homogeneous sheet was obtained by milling the tripolymeric composition on differential rolls while maintaining one roll at room temperature and the other at about 50–75° C.

Example 2

| | Parts by weight |
|---|---|
| Styrene | 750 |
| Ethyl acrylate | 95 |
| Butadiene | 95 |
| Benzoyl peroxide | 4.7 |
| 0.1% aqueous solution of disodium salt of styrene-maleic anhydride copolymer | 2,000 |

The above components were placed in an autoclave fitted with a stirrer and temperature control. The polymerization mixture was heated under constant stirring at 68° C. for 17½ hours and then at 106° C. for 2½ hours. The polymerization product had formed in irregular bead-like particles having no particular shape. The contents of the autoclave were repeatedly washed and finally dried. The product was sheeted to a thickness of 100 mils on the differential rolls in the manner described above.

Example 3

| | Parts by weight |
|---|---|
| Tripolymer of Example 1 | 50 |
| Vulcanizer | 2.5 |

These ingredients were sheeted on the differential rolls until a homogeneous product was obtained. It was then vulcanized at 155° C. for 15 minutes. The molded, vulcanized product was fairly rigid, yet it could be repeatedly flexed.

Example 4

| | Parts by weight |
|---|---|
| Tripolymer of Example 1 | 50 |
| Aluminum oxide (Activated Alumina) | 50 |
| Vulcanizer | 2.5 |

These ingredients were milled together upon the milling rolls until a homogeneous product was obtained. The composition was pressed in a disc flash mold at 150° C. and 2,000 pounds per square inch for 10 minutes. The product was a hard, non-flexible material which would find excellent use in the electrical insulating field.

Example 5

| | Parts by weight |
|---|---|
| Tripolymer of Example 1 | 50 |
| Carbon black | 50 |
| Vulcanizer | 2.5 |

These ingredients were sheeted on the milling rolls until a homogeneous product was obtained. This was then pressed in a flash mold at 150° C. and 2,000 pounds per square inch for a period of 10 minutes. The product was hard and non-flexible. It possessed a smooth, very shiny surface, with a softening point well above that of polystyrene.

Example 6

| | Parts by weight |
|---|---|
| Tripolymer of Example 2 | 50 |
| Vulcanizer | 2.5 |

The above ingredients were sheeted together upon the milling rolls until a homogeneous product was obtained. The composition was then pressed in a disc flash mold at 150° C. and 2,000 pounds per square inch for 10 minutes. The molded product was much less flexible than the product of Example 3. It was hard and possessed a smooth and glossy surface.

Example 7

| | Parts by weight |
|---|---|
| Tripolymer of Example 2 | 50 |
| Polystyrene | 50 |
| Vulcanizer | 2.5 |

The above ingredients were sheeted together upon the milling rolls until a homogeneous product was obtained. This composition was then molded in a disc flash mold at 150° C. and 2,000 pounds per square inch for 10 minutes. The product was hard and possessed a smooth, glossy surface. It was vulcanized as evidenced by its ability to withstand 110° C. for 24 hours without deformation or shrinkage.

Example 8

| | Parts by weight |
|---|---|
| Tripolymer of Example 2 | 50 |
| Aluminum oxide (Activated Alumina) | 50 |
| Vulcanizer | 2.5 |

The above ingredients were milled together upon the sheeting rolls until a homogeneous product was obtained. The sheeted composition was vulcanized by molding in a disc flash mold at 150° C. and 2,000 pounds per square inch for 10 minutes. The product was hard and withstood temperatures of 110° C. for 24 hours without deformation or shrinkage.

Example 9

Samples of Examples 1 and 2 were pressed at 150° C. and 2,000 pounds per square inch for 10 minutes. The discs were transparent. These were placed in an oven at 110° C. for 1 hour. The surfaces became wrinkled or creped with a tendency toward shrinking.

The products of Examples 3–8 were all placed in an oven at 110° C. for 24 hours. No change was noted in these cases, showing that vulcanization had taken place thus preventing distortion of the molded pieces.

It is surprising that the compositions of the present invention can be readily prepared since numerous attempts have been made to prepare tripolymeric compositions of a similar type without notable success. For example, when vinyl chloride is substituted for the styrene in the polymerizable compositions of this invention in an effort to prepare a tripolymer of butadiene, vinyl chloride, and ethyl acrylate, no tripolymer is formed. Similarly, no tripolymer or other useful product is obtained when the system butadiene, styrene and vinyl acetate is subjected to polymerizing influences.

Vulcanization of the products of the present invention may be accomplished through any of the numerous methods used to vulcanize natural, reclaim or synthetic rubber, such as by means of certain nitro compounds, benzoquinone dioxime, thiuram derivatives, sulfur, lead oxide, hexamethylene tetramine, the guanidines, e. g., diphenyl guanidine, and the salts of the thiuram derivatives, etc.

The heat-convertible resins of this invention may be homogeneously mixed with numerous natural and synthetic bodies. For example, they may be mixed with certain types of reclaim rubber, natural rubber, and synthetic rubber. Among the other synthetic bodies with which they may be compounded are: polyalkylene polymers, such as polythene, polyisobutylene, the polyalkylene sulfides, etc. By suitable processing, these resins are compatible with polystyrene, polystyrene copolymers with acrylic esters, with the methacrylic and acrylic acids and esters and copolymers, with the polyvinyl compounds such as polyvinyl acetate, polyvinyl acetals, such as the formal, the butyral and the like, copolymers of vinyl halides with other vinyl and acrylic esters, plasticized polyvinyl chloride, cellulose acetate, and the like. Mineral rubber (i. e., blown asphalt), coumar, indene, and coumar-indene resins as well as factice are extremely compatible with the resins of this invention.

Another extremely unexpected feature of these resins is that they tolerate loading and filling extremely well with resultant increase in electrical and heat resistance.

Among the fillers and modifiers which may be added to these compositions may be mentioned zinc oxide, aluminum oxide, celite, wood flour, walnut shell flour, asbestos, leather scraps, silex, magnesium carbonate, mica, glass, fabric in continuous or shredded form, cellulosic products, calcium sulfate, lignin, lignocellulose, clay, whiting, ferrous oxides, ferric oxide, carbon blacks of all types, e. g., channel black, micronex, gastex, thermax, etc.

As lubricants, there may be used the free fatty acids, such as stearic acid, and lauric acid, salts of the fatty acids, such as the calcium, zinc, tin, etc., salts of lauric, stearic, oleic, etc., acids.

As plasticizers there are a host of materials which may be used, some typical cases of which are the phenyl, benzyl and phenethyl esters of polycarboxylic acids, e. g., the adipates, sebacates, phthalates; the ethers and esters of polyhydric alcohols, for example, esters and ethers of glycol, diethylene glycol, triethylene glycol, glycerine, diglycerine, etc.; for example, the acetates, propionates, butyrates, hexoates, benzoates, toluates. Other plasticizing materials which may be used to modify the tripolymers of this invention may be found in my copending application Serial No. 458,727, filed concurrently herewith and assigned to the same assignee as the present invention, which application was allowed May 2, 1946.

The plasticized and unplasticized polymerization products of this invention in combination with other natural or synthetic resins have extremely wide application. They may be used in moderately flexible or rigid diaphragms which are extremely resistant to attack from air and moisture. In addition, they may be used in preparing resin to metal bonds. Their excellent electrical properties make the resins of this invention suitable for use as insulating materials. They may be applied to wire or cables in the usual manner, for example, by coating from a solution of the resin or by extruding directly onto the conductor with subsequent vulcanization. Solutions of the resins in appropriate solvents may be used as coating compositions or they may be mixed with other varnish constituents and used in this fashion.

When compounded with synthetic rubbers of the styrene-butadiene or acrylonitrile-butadiene types, the whole mixture, including fillers, can be co-vulcanized in the usual manner with or without fillers.

What I claim as new and desire to secure by Letters Patent of the United States is:

1. The process which comprises polymerizing in aqueous emulsion a monomer mixture containing essentially 70 to 80% by weight styrene, 10 to 25% by weight ethyl acrylate and 5 to 10% by weight of a butadiene-1,3 of the formula

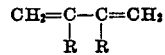

wherein R is a member of the class consisting of hydrogen and the methyl radical.

2. The process which comprises polymerizing in aqueous emulsion a monomer mixture containing essentially 70 to 80% by weight styrene, 10 to 25% by weight ethyl acrylate and 5 to 10% by weight butadiene-1,3.

3. The process which comprises polymerizing in aqueous emulsion a monomer mixture containing essentially 70 to 80% by weight styrene, 10 to 25% by weight ethyl acrylate and 5 to 10% by weight 2-methyl butadiene-1,3.

GAETANO F. D'ALELIO.

REFERENCES CITED

The following references are of record in the file of this patent:

UNITED STATES PATENTS

| Number | Name | Date |
|---|---|---|
| 2,232,515 | Arnold et al. | Feb. 18, 1941 |
| 2,271,125 | Juve | Jan. 27, 1942 |
| 2,271,383 | Arnold | Jan. 27, 1942 |
| 2,273,138 | Thomas | Feb. 17, 1942 |
| 2,230,784 | Reppe | Feb. 4, 1941 |

FOREIGN PATENTS

| Number | Country | Date |
|---|---|---|
| 360,822 | British | Oct. 20, 1931 |
| 522,982 | British | July 2, 1940 |
| 825,357 | France | Dec. 20, 1938 |
| 456,442 | British | Aug. 8, 1935 |
| 715,961 | France | Oct. 5, 1931 |
| 588,785 | Germany | Nov. 27, 1933 |
| 114,023 | Austral | Oct. 9, 1941 |

OTHER REFERENCES

Krczil, p. 322, vol. II, "Kurzes Handbuch der Polymerisationstechnik," pub. 1941 in Leipzig, Ger. by Becker & Erler Kom-Ges. (Copy in Lib. of Cong.)